April 20, 1948. W. R. FREEMAN 2,439,971
SHAFT BEARING
Filed Nov. 1, 1944
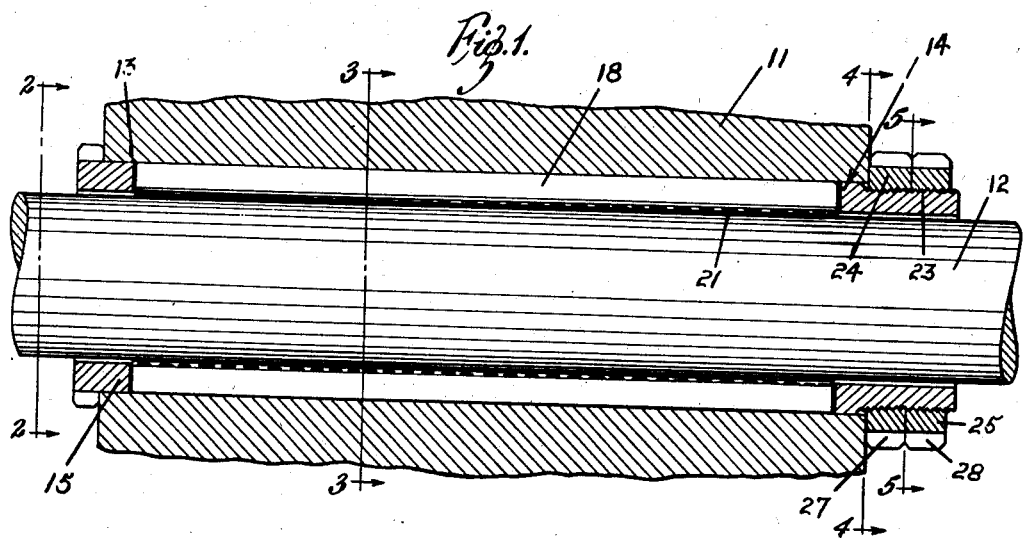
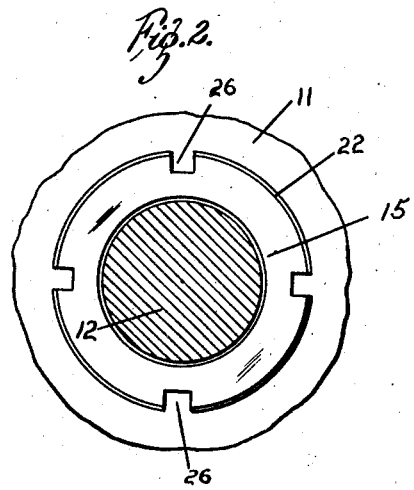
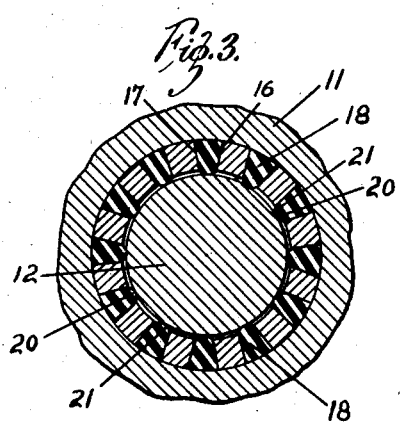
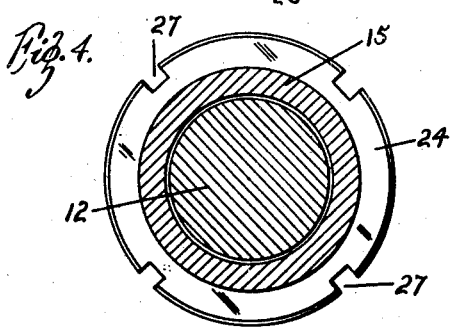
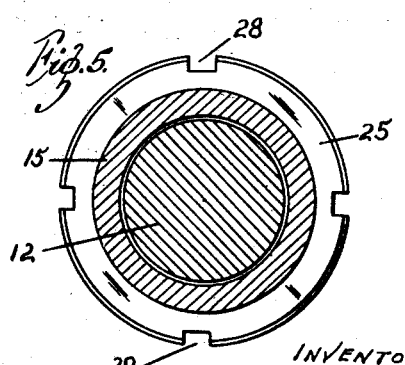
INVENTOR:
WALTER R. FREEMAN,
BY P. H. Lamphere
ATTORNEY.

Patented Apr. 20, 1948

2,439,971

UNITED STATES PATENT OFFICE 2,439,971

SHAFT BEARING

Walter R. Freeman, St. Louis County, Mo.

Application November 1, 1944, Serial No. 561,398

4 Claims. (Cl. 308—239)

This invention relates to bearings and more particularly to a yieldable bearing for a shaft.

One of the objects of the invention is to produce an improved yieldable bearing which will be efficient in operation.

Another object is to produce a yieldable bearing for a shaft which is so constructed as to be provided with a yieldable member which can be readily replaced.

A further object is to produce an improved bearing for a shaft which operates in a submerged liquid containing foreign material.

A still further object is to so construct a bearing for a shaft that the shaft will be supported on yieldable member which may be replaced by similar members when worn or by oversize members when the shaft is worn without the necessity of removing the bearing from the shaft.

Other objects of the invention will become apparent from the following description taken in connection with the accompanying drawings showing a preferred embodiment by way of example.

In the drawings:

Figure 1 is a longitudinal sectional view of a yieldable bearing associated with a shaft and support member; and Figures 2, 3, 4 and 5 are cross sectional views taken, respectively, on the lines 2—2, 3—3, 4—4 and 5—5 of Figure 1.

Referring to the figures in detail, the numeral 11 indicates a support for a shaft 12, said shaft extending through an oversize cylindrical opening 13 in the support. Between the shaft and the support and interpositioned between the shaft surface and the cylindrical surface of the opening 13 is my improved bearing, generally indicated by reference character 14. This bearing acts as a supporting medium between the shaft and the support and provides means upon which the shaft can rotate.

The bearing comprises a cylindrical cage 15 which has such an external diameter as to snugly fit within the cylindrical surface of the opening 13 and an internal diameter greater than the diameter of the shaft 12. This cage is provided with circumferentially spaced longitudinally extending slots 16. The side walls 17 of these slots are arranged to diverge radially outwardly and preferably lie in radial planes from the axis of the cage. Received in the slots are elongated members 18 which are constructed to completely fill the slot and to also extend beyond the inner surface of the cage. The inner extending ends 20 of these members are formed with curved surfaces 21 which are substantially convex as viewed in cross section in Figure 3. The elongated members 18 are constructed of a yieldable material so that the extensions 20 are provided with a yieldable surface with which the shaft surface can engage. Suitable material for the members 18 is rubber, synthetic rubber, yieldable plastic material, leather, etc. The material should have fairly good anti-friction characteristics.

When the bearing is in operative position, as shown, the shaft will rest upon the extending end portions 20 of the elongated members and these members will serve as a bearing for the shaft. The shaft, when rotating, will slide over the ends 20 of the members 18.

One end of the cage 20 is provided with an integral flange 22 and the opposite end of the cage is provided with a threaded portion 23 for receiving a clamping nut 24 and a locking nut 25. By means of the flange 22 and the clamping nut 24 the cage can be securely clamped to the support 11 so that there will be no relative movement between the bearing and the support. The locking nut insures that the clamping action will be maintained. The flange 22 is shown provided with slots 26 and the nuts 24 and 25 are shown as provided with slots 27 and 28 all for the reception of spanner wrenches so that the clamping and unclamping can be easily accomplished.

My improved bearing, as shown and described, is particularly useful as a strut bearing for propeller shafts or other shafts which operate in water or liquids contaminated with foreign material having abrasive characteristics. When the members 18 of the bearing deteriorate they may be readily replaced without the necessity of removing the bearing from the shaft which, if done, would necessitate taking off the propeller if the bearing is being used as a strut bearing. To replace the deteriorated members 18 all that need be done is to remove the clamping and locking nuts and then slide the bearing along the shaft to a position outside of the opening in the support. The members 18 may then be picked out of their slots and new ones positioned therein. The bearing can then be slid back to operative position and clamped to the support. If the shaft 12 should become worn due to the abrasive action of the sand and silt or other foreign material, then with my bearing it is not necessary to replace the expensive shaft in order to take up for the wear. The play resulting from the wearing of the shaft can be readily taken up by replacing the members 18 in the bearing with new members which are slightly oversize, that is, members which are so constructed as to extend slightly farther into the cage opening.

Since the members 18 are made of a yieldable material, the vibration of the shaft will be absorbed by the members. Also if there is any heavy shock load on the shaft this load will tend to be absorbed by the yielding of the materials 18 prior to the shaft coming in contact with the cage.

Being aware of the possibility of modifications in the particular shaft bearing structure shown and described, without departing from the fundamental principles of my invention, I do not intend that the scope of said invention be limited in any manner except in accordance with the appended claims.

Having fully described my invention, what I claim as new and desire to secure by Letters Patent of the United States is:

1. In a bearing for use with two relatively rotatable members having different size internal and external cylindrical surfaces, a cylindrical cage having integral ends and circumferentially spaced longitudinally extending slots with outwardly diverging side walls, said cage having an external diameter adapted to fit within the external cylindrical surface and an internal diameter greater than the external cylindrical surface, elongated members of rubber or like yieldable material having diverging side walls and fitting within the slots and of such a radial thickness as to contact both cylindrical surfaces, and detachable means for preventing the cage from rotation with the member having the external cylindrical surface, and comprising clamping and locking nuts associated with one integral end of the cage.

2. In a bearing for use with two relatively rotatable members having different size internal and external cylindrical surfaces, a cylindrical cage for positioning between the cylindrical surfaces and provided with longitudinally extending circumferentially spaced slots, said slots having inner and outer openings and side walls which diverge outwardly, and non-rotatable elongated members having diverging sides for reception in the slots and extending inwardly beyond the inner surface of the cage and each having a convex yieldable surface for engaging and supporting the member having the external cylindrical surface, said elongated members being of a radial thickness to engage both cylindrical surfaces.

3. In a bearing for use with two relatively rotatable members having different size internal and external cylindrical surfaces, a cylindrical cage for positioning between the cylindrical surfaces and having circumferentially spaced longitudinally extending slots with their side walls diverging outwardly, said cage having its internal diameter greater than the diameter of the external cylindrical surface, and elongated members having diverging side walls for reception in the slots from the outer surface of the cage and being provided with convex surface portions extending inwardly from the cage to engage and support the member with the external cylindrical surface.

4. In a bearing for use with two relatively rotatable members having different size internal and external cylindrical surfaces, a plurality of elongated members for interpositioning between and engagement with both the members and each having a portion provided with a curved yieldable surface upon which the member with the external cylindrical surface is yieldably supported, and means for maintaining the members in circumferentially spaced relation and preventing bodily relative movement with respect to the member having the internal cylindrical surface, said last named means comprising a cage structure having elongated slots so constructed and so receiving the elongated members as to permit free outward radial movement of each elongated member from a slot when the cage and the elongated members are axially removed from the internal cylindrical surface.

WALTER R. FREEMAN.

REFERENCES CITED

The following references are of record in the file of this patent:

UNITED STATES PATENTS

| Number | Name | Date |
| --- | --- | --- |
| 1,637,966 | Singlemann | Aug. 2, 1927 |
| 1,787,810 | Bigelow | Jan. 6, 1931 |
| 1,885,339 | Evans | Nov. 1, 1932 |
| 1,895,936 | Merrill | Jan. 31, 1933 |
| 1,919,375 | Maclachlan | July 25, 1933 |

FOREIGN PATENTS

| Number | Country | Date |
| --- | --- | --- |
| 241,405 | Great Britain | Oct. 22, 1925 |